July 2, 1968 R. L. VAN ANTWERP 3,390,883

RECORD CHANGE CYCLE MECHANISM FOR RECORD PLAYERS

Original Filed Feb. 5, 1964 5 Sheets-Sheet 1

INVENTOR.
Robert L. VanAntwerp
BY Otto A. Earl
ATTORNEY.

July 2, 1968 R. L. VAN ANTWERP 3,390,883

RECORD CHANGE CYCLE MECHANISM FOR RECORD PLAYERS

Original Filed Feb. 5, 1964 5 Sheets-Sheet 2

INVENTOR
Robert L. Van Antwerp
BY [signature]
ATTORNEY.

July 2, 1968 R. L. VAN ANTWERP 3,390,883

RECORD CHANGE CYCLE MECHANISM FOR RECORD PLAYERS

Original Filed Feb. 5, 1964 5 Sheets-Sheet 3

INVENTOR.
Robert L. VanAntwerp

BY Otto A. Earl

ATTORNEY.

July 2, 1968 R. L. VAN ANTWERP 3,390,883

RECORD CHANGE CYCLE MECHANISM FOR RECORD PLAYERS

Original Filed Feb. 5, 1964 5 Sheets-Sheet 4

INVENTOR.
Robert L. VanAntwerp
BY
ATTORNEY.

RECORD CHANGE CYCLE MECHANISM FOR RECORD PLAYERS

Original Filed Feb. 5, 1964

INVENTOR.
Robert L. VanAntwerp
BY Olsen & Earl
ATTORNEY.

United States Patent Office 3,390,883

Patented July 2, 1968

3,390,883

RECORD CHANGE CYCLE MECHANISM FOR RECORD PLAYERS

Robert L. Van Antwerp, Benton Harbor, Mich., assignor to Maestro Corporation, Stevensville, Mich., a corporation of Michigan Continuation of application Ser. No. 342,765, Feb. 5, 1964. This application Aug. 26, 1966, Ser. No. 584,292
16 Claims. (Cl. 274—10)

ABSTRACT OF THE DISCLOSURE

A changer mechanism for records having a friction drive for controlling tone arm movement. The friction drive comprises a first member rotatably fixed the tone arm shaft and a second rotatable member frictionally engageable therewith, the second member having cam means thereon for lifting the tone arm off the record surface and for clutchably engaging the tone arm for moving it radially outwardly to a position adjacent the edge of the record. The first rotatable member controls and actuates a cyclic changer device whenever the tone arm reaches the radially innermost position of the record, which mechanism in turn actuates the second rotatable member to frictionally engage the first rotatable member for returning the tone arm to its original position. Continued movement of the changer mechanism causes the tone arm to move radially inwardly whereby the tone arm cooperates with a manually actuated size selector mechanism for positioning the tone arm on the edge of the next deposited record.

This application is a continuation of application Ser. No. 342,765, filed Feb. 5, 1964.

This invention relates to improvements in record change cycle mechanism for record players. The principal objects of this invention are:

First, to provide an automatic record changer which is of compact thickness or height and which incorporates yieldable, over-travel connections between its elements so that the parts can be economically manufactured and assembled without holding the parts to close tolerances, and without sacrificing reliable operation of the changer assembly.

Second, to provide a record changer which returns the pickup arm gently to the surface of records of a preselected size in a minimum change cycle period and which permits manual movement of the pickup arm without actuating the change cycle mechanism.

Third, to provide a record changer change cycle mechanism having simple inexpensive and light parts which have no critical wear points so that the mechanism is light, reliable and long lived.

Fourth, to provide a changer mechanism driven from a cyclically operated gear which operates a lever to first raise and retract the pickup arm by a frictional drive, then eject or deposit a new record in playing position and then return the pickup arm and pickup to playing position by friction force and at a slow speed so that the engagement of the pickup with the record is accomplished gently and so that the record ejecting or placing cycle can be accomplished while the tone arm is locked in position, thus preventing damage to either the change cycle mechanism or the pickup arm if the pickup is accidentally left in locked position.

Fifth, to provide a record changer in which the advancing and lowering of the pickup arm is stopped in a preselected position according to the size of record being played and in which the pickup arm stop is retracted after the pickup arm and pickup have been lowered into contact with the record so that the pickup is accurately located on the record without overtravel or objectionable oscillation.

Sixth, to provide a record changer mechanism which is engaged with its driving pinion by automatic or manual movement of the pickup arm to the end of the playing area of the record, or by manual operation of a control arm and finger piece that also turns the player on and off.

Seventh, to provide a multiple speed record changer with a drive disengaging connection between the on-off switch and control lever and a table driving idler wheel so that the spring urging the idler wheel to driving position does not tend to overcome the switch and turn the player on unintentionally, or require an excessively strong spring biasing the switch to "off" position.

Eighth, to provide a changer assembly in which the control arm for actuating the on-off switch has an interlock with the record support arm that permits the descent of the record support arm following the release of the last record to condition the changer and control arm to turn the player off after the playing of the last record with the pickup arm in raised and retracted position.

Ninth, to provide a record changer with a pickup arm pivot yieldably coupled to the record tracking and cycle actuating mechanism of the changer so that the cycling mechanism may operate without damage to its parts even if the pickup arm is manually held or locked in place.

Tenth, to provide a record changer with a horizontal pivot and approximately balanced position at about the playing level of the pickup for accurate compliance with the surface of records being played, and a second false pivot permitting the pickup arm to be raised to vertical position for examination or repair of the pickup.

Other objects and advantages of the invention will be apparent from a consideration of the following description and claims. The drawings, of which there are five sheets, illustrate a highly practical form of the invention.

*General arrangement*

Figures 1, 10:
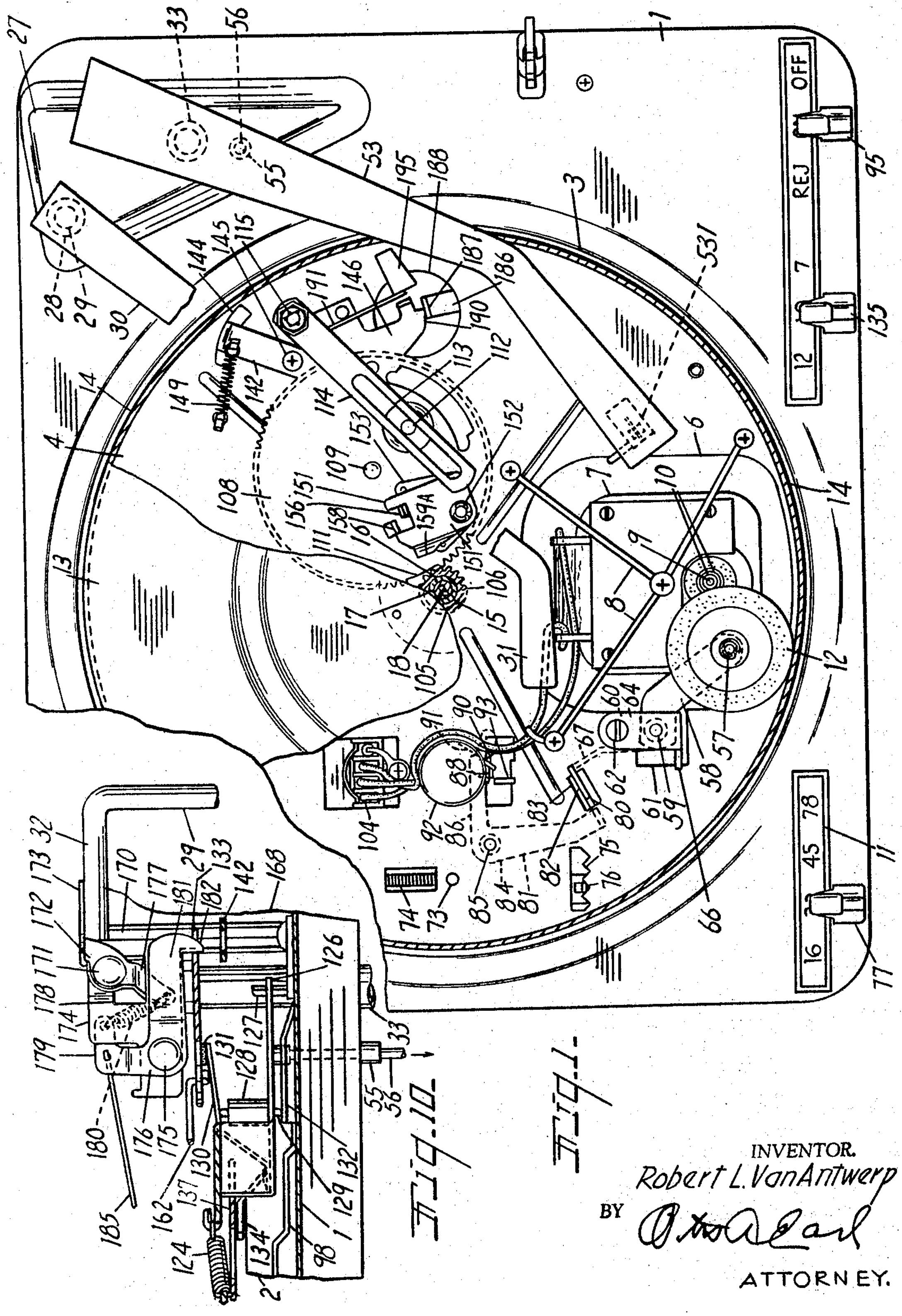
FIG. 1 is a fragmentary top plan view of the record changer with a large portion of the turntable broken away in section to illustrate sub-adjacent portions of the mechanism.
FIG. 10 is a fragmentary cross sectional view of the same structure as FIG. 9 in another operative position corresponding to that assumed upon release of the last record on the machine.

The changer is assembled on a rectangular body panel 1 having a downturned peripheral flange 2 and a central depressed well with a cylindrical side wall 3 and bottom 4. The bottom is ribbed at 5 for stiffness and has a generally rectangular opening 6 within which the motor 7 is supported on a spider 8. The motor mount is more particularly described and claimed in my co-pending application, Ser. No. 257,494, filed Feb. 11, 1963, now Patent No. 3,198,528 for Motor Mounting For Phonographs. The arms of the spider are flexible to cushion and absorb torsional vibration of the motor as it drives its stepped shaft 9. The shaft has four steps 10 of different diameter corresponding to the four standard speeds of records 16, 33, 45 and 78 r.p.m. as shown on the indicator scale 11. The shaft drives an idler wheel 12 by frictional engagement between the periphery of the wheel and one of the steps 10. The idler wheel in turn frictionally drives the turntable 13 by engagement with the inside of the downturned peripheral flange 14 on the turntable that nests and rotates within the well. The mechanism for adjusting the idler wheel and the turn table speed will be described presently.

The center of the bottom wall 4 of the well supports a hollow fixed post 15 with a notch 16 on one side. The post receives the upwardly projecting record support spindle 17 and ejector lever 18. A lug on the spindle enters the notch 16 and holds the spindle against rotation. The lever 18 projects both upwardly and downwardly through a slot in the side of the spindle to a lower actuating end 19 projecting below the lower end of the spindle and below the bottom 4 of the well in the body panel (see FIG. 5). The action of the ejector lever and the spindle in supporting and ejecting (releasing) successive records to be played is more particularly disclosed in my co-pending application Ser. No. 246,242, filed Dec. 20, 1962 now abandoned for Record Supporting Spindle and Release Mechanism for Automatic Phonographs. The post 15 is retained on the panel by having its lower end peened or rolled over a retaining plate 20 having a narrow ear 21 turned upwardly through a hole 22 in the bottom 4 of the well to hold the post against rotation. A downturned flange 23 has a slot therethrough passing the loop 24 of a spring wire 25. The other end of the wire is anchored in a tab 26 on the plate 20 and the wire passes yieldably through an annular groove in the bottom of the spindle to releasably hold the spindle in place.

At its upper right corner (FIG. 1) the body panel 1 has a generally triangular raised platform 27, conveniently made of plastic, secured thereto. The platform has an upstanding tubular journal 28, which may be integrally molded with the platform, to rotatably and reciprocably support the record support and steady shaft 29. The shaft has the record support arm 30 secured to its upper end that extends swingably radially inwardly over the turntable with a hooked end 31 angled around the spindle 17. At its lower end, the shaft 29 has a laterally turned control end 32 (see FIGS. 2, 5 and 10) for a purpose to be described. The support arm 30, 31 overlies a stack of records supported on the spindle and keeps the records flat as is common. It also descends as the records are released from the stack toward the top of the journal 28 to that the end 32 functions when all records have been lowered to the turntalbe.

The platform 27 also has an elongated vertical boss 33 forming a journal for the pickup arm support shaft

34. The shaft carries an upright yoke 35 (see FIG. 11) with convergent side flanges 36 and 37 on its top and a rearwardly offset upstanding anchor column 38. The main pickup arm pivot pin 39 is suported at one end in the flange 36 and slidably supported in a horizontal slot 40 in the flange 37 at approximately the level of records being played on the turntable. A pickup arm support member 41 has downturned ears 42 pivoted on the pin 39. Spring 43 positioned around the pin biases the pin and the support member toward the side of the yoke having the slotted flange 37.

The support member 41 has an upwardly offset, forwardly projecting tongue 44 with plural holes 45 therein. A pickup arm balance spring has one end anchored on the column 38 and its other end selectively hooked in one of the holes 45 to balance the weight of the pickup arm and bias the support member and pivot pin 39 toward the rear of the slot 40 and approximately over the vertical axis of the shaft 34. The shaft 34 is hollow and the support member 41 has a hole 46 therein through which the lead wires 47 to the pickup extend. The yoke 35 has an upstanding flange 48 with a screw 49 therein that adjustably abuts the pin 39 to locate the rearward normal position of the pin over the shaft axis. The slotted engagement of the pivot pin with the yoke 35 permits the pickup arm to be held or even locked without interfering with the change cycle of the changer as will be described.

The pickup arm support member 41 projects rearwardly as at 50 to upstanding ears 51 that support a false or auxiliary pivot pin 52 above and askew to the main pivot pin 39. The pickup arm 53 is downwardly chambered or channel shaped and is pivoted on the pin 52. The arm swings horizontally and vertically with the support member 41 and angles over the turntable with the pickup cartridge 531 in its outer end. A screw 54 on the tongue 44 adjustably supports and determines the downwardly rotated position and level of the pickup arm on the support member 41.

A third boss 55 on the platform 27 reciprocably supports the pickup lift pin 56 that slirably engages the underside of the raised tongue 44 of the support member to tilt the support member 41 and the pickup arm carried thereby during the record changing cycle.

*Speed change mechanism*

Figures 4, 8, 11, 12, 14:
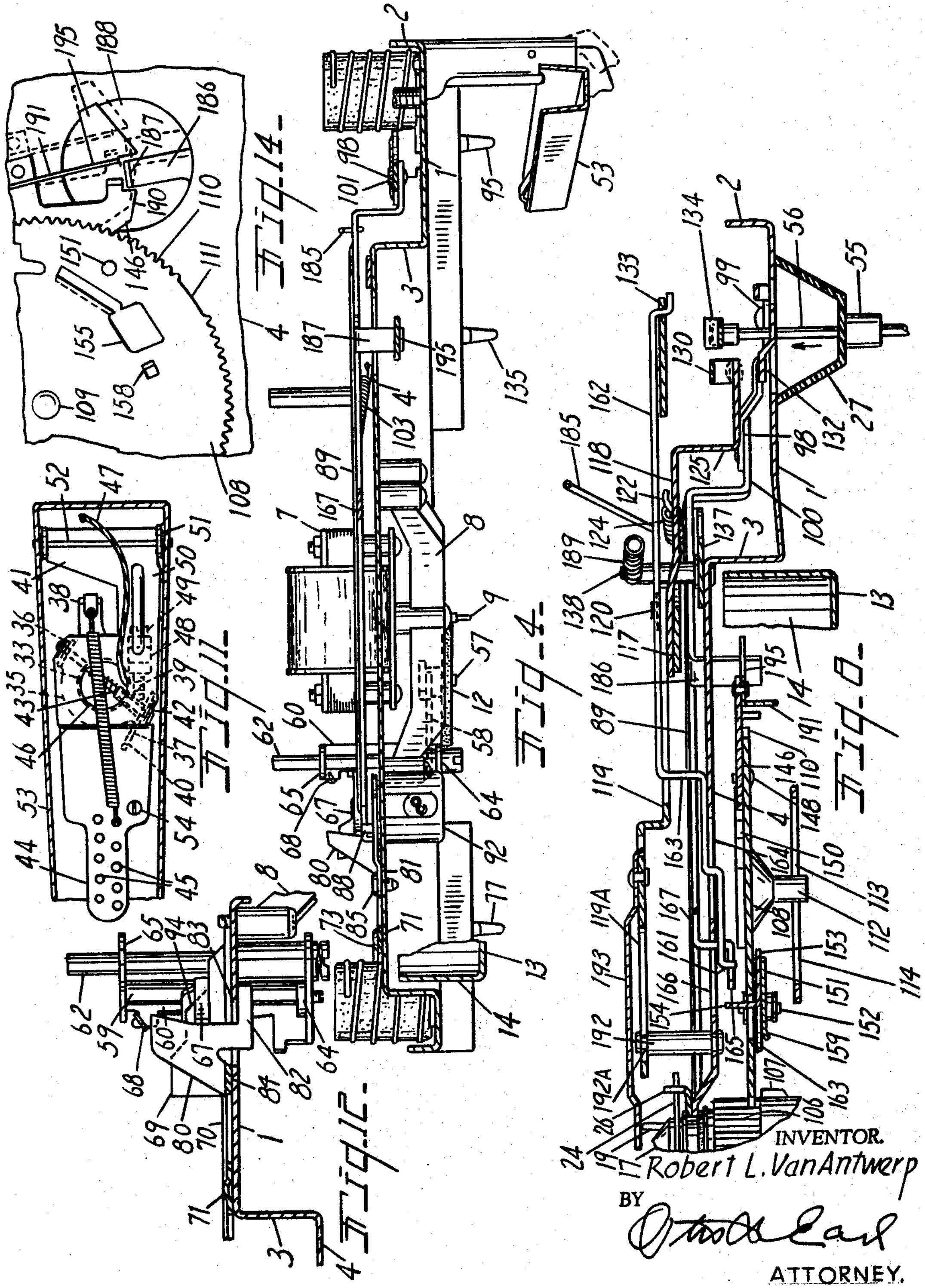
FIG. 4 is a cross sectional view taken along the plane of line 4—4 in FIG. 2, showing the changer in inverted position.
FIG. 8 is an enlarged fragmentary cross sectional view taken along the plane of the line 8—8 in FIG. 2, again showing the structure in inverted position.
FIG. 11 is a fragmentary cross sectional view taken along the plane of the line 11—11 in FIG. 6 showing the pickup arm hinge from the top.
FIG. 12 is a fragmentary cross sectional view taken along the plane of the line 12—12 in FIG. 2.
FIG. 14 is a fragmentary top plan view similar to FIG. 13 showing the mechanism in automatic shut-off position after playing the last record.

The idler wheel 12 is supported upon a stub shaft 57. The shaft is mounted on the swing end of an arm 58 pivoted at 59 on an upright yoke 60. The yoke swings and reciprocates in a rectangular notch 61 opening from the side of the motor opening 6 in the body plate. A stud 62 projecting above and below the bottom 4 rotatably and slidably supports the upper arm 64 and lower arm 65 of the yoke. An upper ear 66 (see FIG. 1) projects over the bottom 4 to limit downward movement of the yoke. An angled arm 67 projecting from the side of the yoke below the plate limits upward movement of the yoke, pivot 59 and idler wheel. (See FIGS. 1, 2, 3 and 12 and note that FIGS. 2 and 12 are inverted.) A spring 68 biases the yoke upwardly and laterally toward the motor shaft.

The laterally angled end of the arm 67 underlies a downwardly projecting flange 69 on the arcuate arm 70 of a speed selector lever 71. The lever is yieldably pivoted by the slot 72 surrounding the pin 73. Compression spring 74 biases the lever toward the idler wheel assembly. The notched edge 75 of a hole in the bottom plate 4 engages a lug 76 struck from the lever to hold the lever in selected adjusted positions as set manually by the finger piece 77 secured to a slide 78 that projects upwardly through the body plate 1. The slide is guided on a support rod 79 mounted below the body plate and has a sliding engagement with the forward end of the lever permitting longitudinal shifting of the lever over the notches 75. The end of the angled arm 67 also projects into the path of a depending flange 80 on a crank 81. The flange 80 has a finger 82 projected upwardly and over the edge of a hole 83 to support the arm 84 of the crank along with the pivot screw 85.

The other arm 86 of the crank 81 has a cammed edge 87 lying in the path of an upturned switch actuating ear 88 on the end of a switch actuating push bar or rod 89. The ear 88 projects between the bifurcated ends 90 of the on-off lever 91 of switch 92. The switch mounted on top of the bottom plate 4 is turned on by clockwise rotation of the ears 90 as viewed in FIG. 1. An ear 93 on the on-off push rod overlies the plate 4 and holds the push rod up. Movement of ear 93 to "off" position actuates crank 81 through cam edge 87 so that flange 80 moves arm 67 and yoke 60 to disengage the idler. The mechanical advantage of ear 88 on cam 87 prevents spring 68 from turning switch 92 back on.

Figure 2:
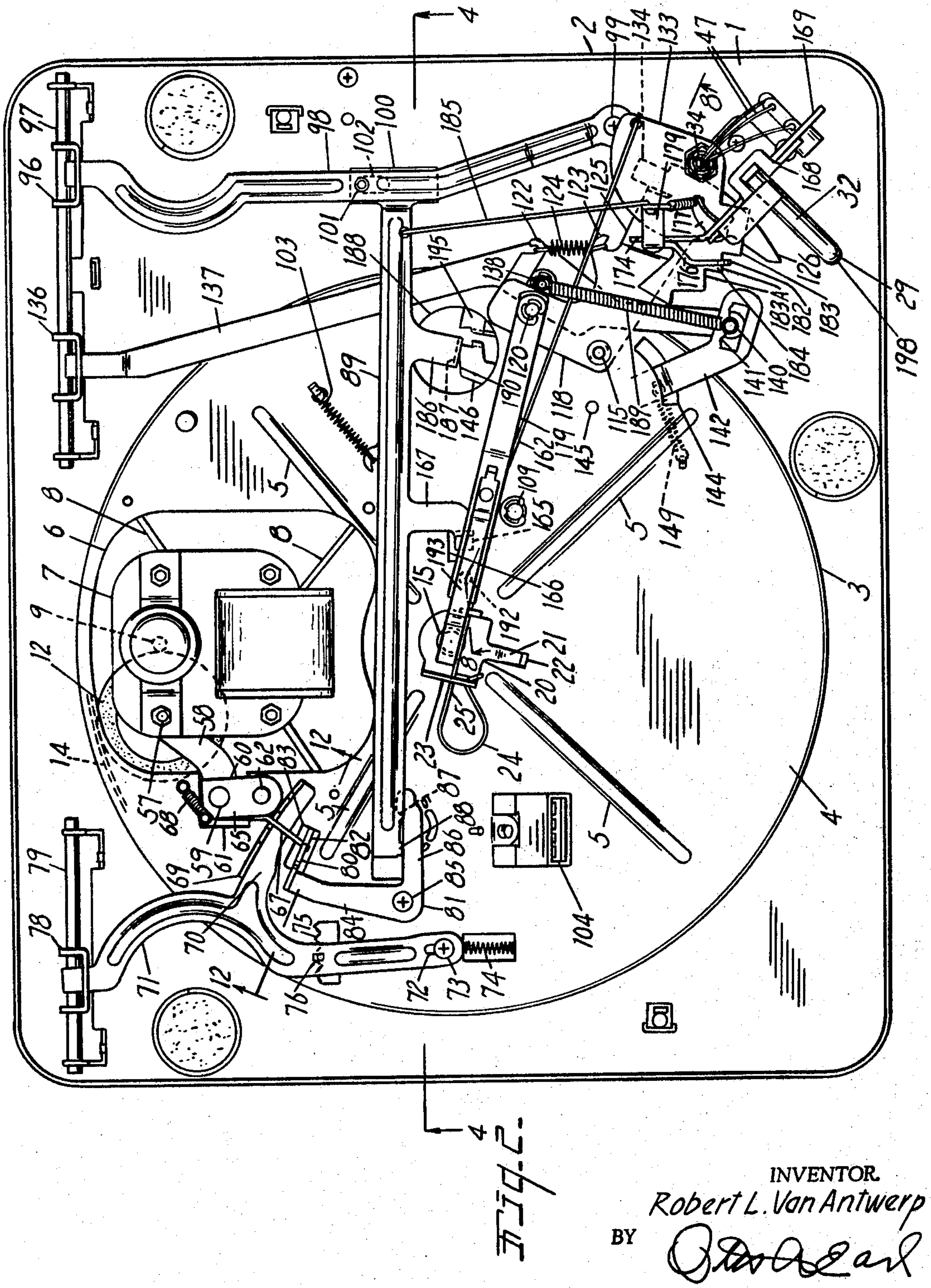
FIG. 2 is an inverted or bottom plan view of the structure shown in FIG. 1.
Figures 3, 7, 9:
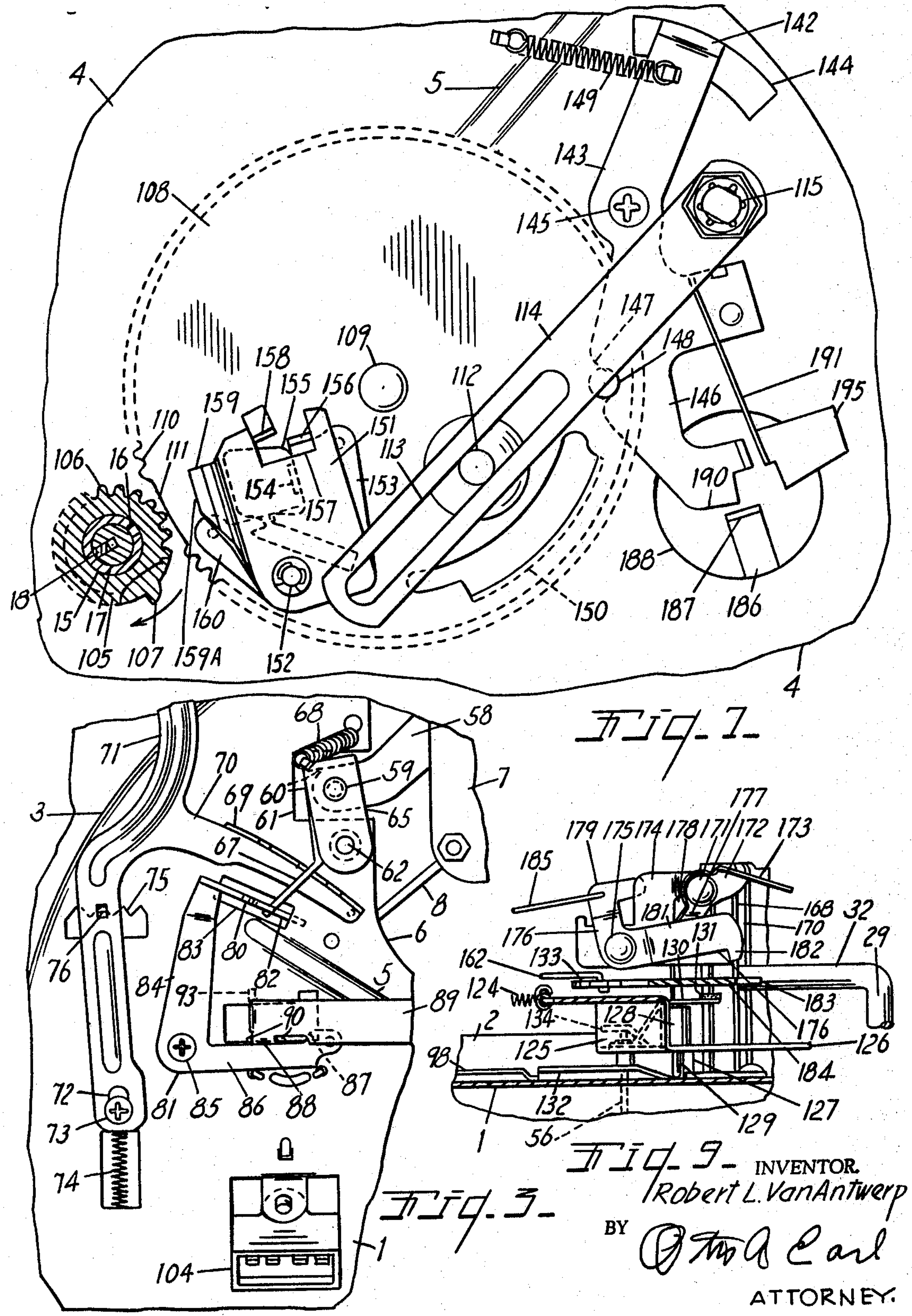
FIG. 3 is an enlarged fragmentary bottom plan view of the speed selecting mechanism appearing in the upper left hand corner of FIG. 2.
FIG. 7 is an enlarged fragmentary top plan view showing the change cycle drive mechanism in the center of FIG. 1 with the turntable pinion in cross section.
FIG. 9 is a fragmentary cross sectional view taken along the plane of the line 9—9 in FIG. 5 showing the parts in inverted position.

As the finger piece 77 and lever 71 are moved to the right in FIGS. 1, 3 and 12 toward faster speed of 45 r.p.m., the cammed edge 94, flange 69 first pushes angled arm 67 counterclockwise or to the left as viewed in FIGS. 3 and 12. This rotates the yoke 60 away from the motor and disengages idler wheel 12 from one step on the shaft 9. It also lowers the arm 67 and the yoke so that as the arm 67 clears the cammed edges 94, the spring 68 returns the yoke and idler wheel into driving engagement with the next larger and higher speed step 10 on shaft 9. Reverse actuation of the speed selector lever 71 merely lets the arm 67 and yoke 60 ride up to position the idler wheel against the smaller slower speed steps on the motor shaft.

*On-off reject control*

The finger piece 95 operates a slide 96 (see FIG. 2) on the support rod 97 that is laterally drivingly engaged with the "on-off" lever 98. The lever is fixedly pivoted at 99. The "on-off" push rod has an upwardly offset right end 100 overlying the lever 98 and coupled thereto by the pin 101 projecting through the slot 102 in the end of the push rod. The push rod is biased toward switch-off position by a light spring 103. Moving the lever 98 and push rod 89 to the right moves ear 88 and switch lever 91 to "off" position. The switch 92 is connected to a terminal jack 104 and may include wires for controlling an amplifier as well as the motor 7. Reverse movement to the "on" position of push rod 89 to "on" position turns on the switch and also moves the bifurcated ends 90 of the switch lever so that the push rod and lug or ear 88 may be moved further to "reject" position as will be described.

*Automatic change mechanism*

The turntable 13 has a hub 105 on its underside that rotates around the fixed post 15 on suitable bearings (not illustrated). On its lower end, the hub 105 has continuous pinion teeth 106 that rotate continually whenever the turntable rotates. Above the teeth 106, the hub has a change cycle engaging lug 107 that projects radially from the hub and also rotates therewith. (See FIG. 7). Rotatably mounted on top of the bottom plate 4 is a change cycle gear 108 having an axle support 109 and teeth 110 located in the plane of the teeth 106 on the pinion hub. The teeth 110 are interrupted at 111 and this interrupted portion 111 is always opposite the teeth 106 when the mechanism is in record playing position as illustrated so the change cycle gear does not rotate. The gear 108 carries an upstanding crank pin 112 operating in a slot 113 in an actuator arm 114. The arm 114 is connected to and oscillatably drives a shaft 115 extending through a bearing 116 to an actuator lever 117 located on the bottom of the bottom plate 4. Pivoted on the shaft 115 below (on top as viewed in FIGS. 2, 5 and 8) the actuator lever is a cam arm 118. The actuator lever is directly connected to ejector link 119 by a pin 120 but is not directly connected to the cam arm. A slot 121 in the cam arm permits the actuator lever, pin 120 and ejector link to move a limited distance relative to the cam arm. However, a hook 122 on the actuator lever is connected to a hook 123 on the cam arm by a relatively stiff tension spring 124 so the cam arm moves counterclockwise in FIG. 5 with the actuator lever.

Figures 5, 6, 13:
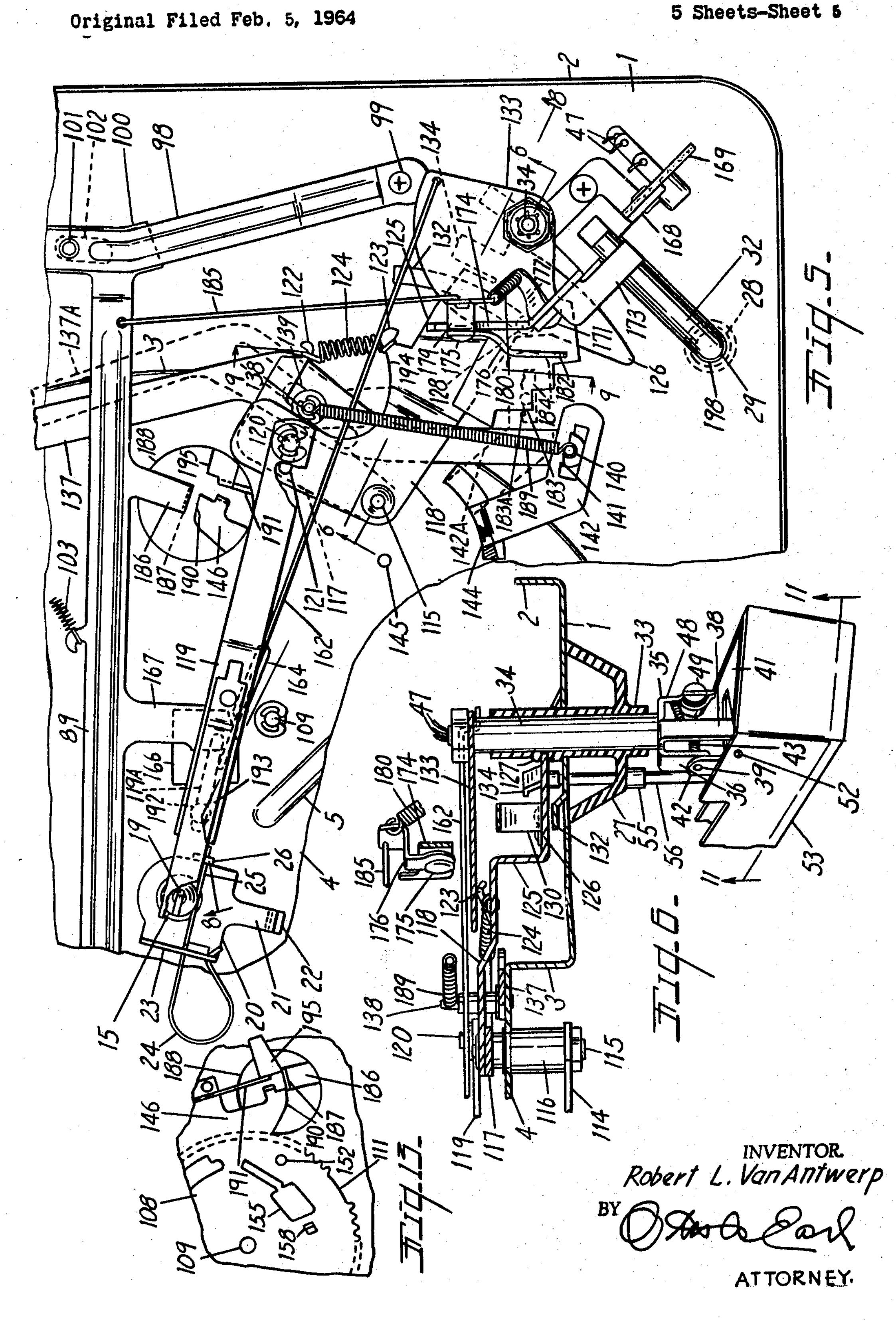
FIG. 5 is an enlarged fragmentary bottom plan view showing the structure appearing in the lower right hand corner of FIG. 2.
FIG. 6 is a fragmentary cross sectional view taken along the plane of the line 6—6 in FIG. 5, again showing the parts in inverted position.
FIG. 13 is an enlarged fragmentary top plan view showing the automatic shut-off mechanism at an intermediate position of its cycle of operation.

The cam arm as appears in FIGS. 5 and 6 projects laterally and downwardly at 125 to a sector shaped end 126 guided between lugs 127 on the bearing 34. The sector end carries a depending bushing 128 that guides a pin 129. The sector end also carries a leaf spring 130 with a friction pad 131 on its lower end. When the sector end 126 is rotated counterclockwise in FIGS. 2 and 5 or to the left in FIGS. 9 and 10, the pin 129 rides down on a cam shelf 132 struck down from the main body plate 1. This lowers the spring leaf and friction pad 131 into frictional driving contact with an index plate 133 mounted on and rotatable with the lower end of the pickup arm support shaft 34. When the sector end 126 and cam arm 118 are in unactuated position as in FIGS. 5 and 9, the pin 129 is down and the index plate 133 rotates freely with the pickup arm.

The sector shaped end 126 also carries a downwardly off set cam ear 134 on its back edge that engages and actuates the lower end of the pickup arm lift pin 56 upon oscillation of the cam arm 118. Oscillation of the cam arm 118 and its sector end 126 thus functions to both oscillate the index plate to swing the pickup arm in and out and to reciprocate the pin 56 to raise and lower the pickup arm at the proper time.

*Record size selector*

The finger piece 135 on top of the body panel moves a slide 136 on the rod 97 to swing the forward end of the size selector lever 137. The lever slides on the pivot pin 138 passed through a slot 139 and has a pin 140 on its rear (lower end in FIG. 5) selectively engageable in one of three notches 141 in the lower arm 142 of a crank 143. The arm is angled upwardly through a slot 144 and pivoted at 145 alongside of the change cycle gear 108. The opposite arm 146 of the crank partially underlies the change cycle gear and has a detent notch 147 (see FIG. 7) engageable with a depending pin 148 on the gear in the at rest position of the gear. A spring 149 biases the upper arm 146 of the crank away from the change cycle gear. A downturned segmental arcuate flange 150 on the gear obstructs and limits clockwise rotation of crank 146 during the first part of the rotational cycle of the gear after a momentary counterclockwise movement as the pin 148 moves out of the detent notch 147.

*Change cycle initiating*

The change cycle gear is started on a cycle by a trip pawl 151 pivotally supported by a pin 152 near the rim of the change cycle gear and ahead of the gap 111 in the gear teeth. The trip pawl overlies and frictionally engages a trip lever 153, also pivoted on the pin 152. The lever 153 has a downturned flange 154 that hangs through an opening 155 in the cycle gear. It also has an upturned ear 156 positioned in a peripheral notch 157 in the trip pawl. An upturned ear 158 on the gear is positioned in the same notch to limit movement of the trip pawl on the gear. An outwardly projecting raised flange on the trip pawl has a radially extending abutment edge 159 while the lower trip lever has a radially outwardly projected disconnect nose 160 positioned angularly in advance of the edge 159. The downturned flange 154 projects into the path of the end 161 on a trip wire 162. The wire is connected to the index plate 133 and extends under the cam arm 118, bends upwardly over the ejector link 119 at 163 and again upwardly through a slot 164 in the bottom panel to oppose the flange 154 on the trip lever 153.

The flange 154 on the trip lever is also in the path of a finger 165 bent upwardly and laterally through the hole 166 from an arm 167 on the switch actuating bar 89. Thus either movement of the trip wire 162 by the index plate under the influence of the pickup arm reaching the inner end of the playing area of a record, or movement of the "on-off" lever 98 and switch actuating bar 89 to "reject" position can move the trip lever outwardly of the cycle gear. The ear 156 in turn moves the trip pawl 151 outwardly until the edge 159 is in the path of the drive pawl 107 on the turntable hub and on the next revolution of the hub the pawl picks up the trip pawl and rotates the change cycle gear until the teeth on the pinion engage the teeth on the gear. The gear then makes a complete revolution driving the change cycle mechanism and also incidentally moving the trip lever and its flange 154 out of registry with the trip wire 162 and the pawl 165 on the switch actuating bar. Note that movement of switch actuating bar to "reject" position does not turn off the switch 92 and that the spring 103 returns the switch actuating bar to switch "on" position automatically. When the change cycle gear 108 nears the completion of its rotational cycle, the projecting nose 160 on the trip lever 153 strikes the pinion teeth 106 and is moved radially inwardly on the change gear. The ear 156 moves the trip pawl inwardly so the gear stops when the interruption 111 in its teeth registers with the pinion.

*Record size and last record interlock*

Mounted on the bottom of the body plate 1 adjacent the pickup arm shaft is a depending support plate 168. This carries the electrical terminal board 169 for the wires 47 from the pickup and also defines a vertical slot 170 guiding the laterally turned lower end 32 of the record support post 29 in all but the fully raised position of the record support arm. The plate has a pivot 171 for a crank 172 with a flange 173 lying in the path of the end 32 on the record arm support post. An angled flange 174 on the plate 168 has a pivot support 175 for a record size setting crank 176.

The other arm 177 of crank 172 is angled through a hole 178 in the plate into the plane of the lower arm 179 of crank 176 and the two arms are connected by a light tension spring 180. The upper arm 181 of crank 176 has a hooked end 182 engageable with a trailing edge 183 on a sector-like projection 184 on the index plate. Lowering of the record support arm post 29 to the bottom of its travel engages its end 32 with the flange 173 to rotate the crank 176 through spring 180 and engage the hook 182 with trailing edge 183 of the index plate in blocking relation to pickup arm advancing motion of the index plate. With the record support arm post 29 raised, the crank 176 and its hook 182 are lowered by a wire link 185 connected to the switch actuating cross bar 89. This bar is biased forwardly by the spring 103 to disengage the hook 182.

A rearwardly projecting arm 186 on the bar 89 has an upstanding ear 187 that extends through a hole 188 in the bottom plate adjacent the end of crank arm 146. As previously noted, this crank is biased by the spring 149 and has its opposite end 142 extended down through the plate to the notched slot in which the pin 140 rides. Three notches 141 selectively engage the pin according to the setting of the record size selector lever 137 and the pin is urged into one of the notches 141 by the spring 189. Spring 189 acting through pin 140 biases the arm 142 and crank 143 oppositely from spring 149. Spring 189 is stronger when fully extended than spring 149 so spring 189 controls until pin 148 or flange 150 on the cycle gear move the crank 145 counterclockwise in FIG. 1. An angular nose 190 on the front end of lever 146 opposes the ear 187 on the arm 186 of the switch operating cross bar 89. A laterally flexible leaf spring 191 is mounted on the lever 146 in spaced relation to the nose 190.

*Cycle of operation*

Assuming one record playing on the turntable and second and third records of like size and speed on the spindle, the parts will be as shown, excepting FIGS. 10, 13 and 14. As the pickup arm follows the record groove into the center of the record, index plate 133 rotates with the pickup arm support shaft counterclockwise as viewed in FIGS. 2 and 5. Wire 162 and its end 161 approach the ear 154 on the trip lever 153 and move it outwardly of the change cycle gear 108. The trip pawl 151 follows by friction but the flat side 159A is struck by the rotating drive pawl 107 returning the trip pawl until the more rapid movement of the pickup and pickup arm in the spiral run out groove of the record moves both the lever and pawl outwardly so that the pawl strikes the edge 159 and rotates the gear 108 until teeth 106 mesh with the gear. The change gear than rotates swinging the actuator arm 114, shaft 115, actuator lever 117 and ejector link 119.

Acting through stiff spring 124, the lever 117 also immediately moves cam arm 118 and its upturned end carrying pin 129 and cam flange 134. Cam flange immediately raises pin 56 lifting the pickup arm off of the record. Next, pin 129 raises on cam surface 132 engaging the friction pad 131 with index plate 133 to retract the pickup arm and the trip wire 162. The ejector link 119 moves with pin 120 toward the record ejector or release lever 18 in the spindle. The link is slotted at 119A and supported in a groove 192A in post 192 while a leaf spring 193 supports the lower end 19 of the ejector lever. The travel of link 119 necessary to release a record is such that the pickup arm will be raised and angularly retracted before the second or bottom record on the spindle is released. This action takes place in less than one half of the revolution of the change cycle gear 108 as the pin 112 moves counterclockwise in FIGS. 1 and 7 past shaft 115. Note that actuator arm 114 and lever 117 can overtravel index plate 133 due to the friction drive by pad 131.

On the underside of the panel, spring 189 anchored on the pivot pin 138 and connected to the pin 140 on on the size selector lever 137 tends to move the selector lever forwardly and at the same time rotate the arm 142 of lever 146 counterclockwise in FIGS. 2 and 5. This motion is initially opposed by engagement of the edge of the lever 146 above the panel with the downturned flange 150 on the change cycle gear (see FIG. 7). As the flange 150 passes lever 146, the lower arm 142 and pin 140 move counterclockwise into the path of the corresponding record size notch 183A on the index plate 133. The extent of movement of lever 146 is limited by engagement with fixed pin 138 in the rear end of slot 139 in the size selector lever 137 and angular rotation of the lever 143 under the influence of spring 149 so that pin 140 is located according to the selected record size determining notch 141 in which it is held. As the edge 194 on cam plate 118 strikes pin 138 thus stopping rotation of friction pad 131 and pickup arm retracting motion of index plate 133, actuator arm 117 and pin 120 continue to advance with the pin moving in slot 121 to actuate record ejector lever 119 with the pickup arm fully raised and retracted.

Continued rotation of cycle gear pin 112 reverses oscillation of shaft 115 and actuator arm 117. This first retracts pin 120 and ejector bar 119. As further retraction releases the tension created in spring 124 and pin 120 reaches the other end of slot 121, the cam arm 118 is also retracted and the friction drive of pad 131 starts retraction of index plate 133. This swings the pickup arm in until the selected record size notch 183 strikes the advanced pin 140 stopping the pickup correctly over the edge of the second record. Cam arm 118 continues to retract lowering pickup arm support pin 56 along cam flange 134 till the pickup is located gently on the record. The pin 148 on the change cycle gear then gradually advances lever 146 and retracts pin 140 from the notches 183 so that the index plate and pickup arm are free to rotate in playing motion on the record.

When the second record finishes playing the same ejector cycle is followed except that as the third and last record falls to the turntable, the record support rod 29 and its lower arm 32 drop to engage flange 173 of crank 172. Acting through spring 180 this tends to pull wire 185 and switch control bar rearwardly against spring 103 on pin and slot connection 101–102 to the "on-off" lever 98. However, at the time record ejector bar 19 in the spindle is actuated and rod 29 falls, lever 146 has retracted behind flange 150 as shown in FIG. 13 and flange 195 on leaf spring 191 blocks rearward movement of ear 187 (see FIG. 13). Flange 195 projects slightly rearwardly of abutment 190 so when arm 146 advances with lever 142, flange 187 is still opposed. The change cycle gear continues its cycle and the last or third record plays to the end.

When the trip pawl 151 is actuated at the end of the last record, the change cycle gear cycles as before to raise and retract the pickup arm but when the abutment 190 on lever 146 retracts as the lever moves beyond flange 150, the spring loaded switch bar 89, arm 186 and ear 187 slide rearwardly into the path of the edge of the flange 195. The leaf spring 191 yields permitting continued retracting clockwise rotation of double arm crank 142–146 until cycle gear 108 completes its cycle and pin 148 rotates lever 146 counterclockwise. (See dotted position FIG. 14.) This causes abutment 190 to move ear 187, arm 186 and bar 89 to the right to "off" position at which time ear 88 at the left end of the bar turns switch 92 off. The engagement of the hook 182, held up by spring 180 and crank 172, with edge 183 of sector plate 184 will have prevented advance of the index plate 133 so the pickup arm remains retracted. When abutment 190 moves ear 187 and switch bar 89 to the right or "off" position, spring 103 returns bar 89 forwardly on the pin and slot connection 101, 102 so the on-off bar 89 and ear 187 reassume normal position. The on-off control may be manually returned to "reject" position to replay the last record but the mechanism will remain in automatic shut-off condition until the record holding arm and post are elevated to put more or different records on the spindle.

The record hold-down arm 30 and its support rod 29 can be raised until the angled end 32 is above the slot 198 in the body plate 1 where it can be rotated under the platform 27 to remove records from the turntable and place a new stack of records on the spindle 16. On restarting the changer by turning the switch "on," the player may be started by manually placing a first record on the turntable and placing the pickup on the record, or by moving the pickup arm to the spindle or by moving finger piece 95 to "reject" position to start the changer on the first change cycle to drop the first record of a new series of cycles.

The embodiments of the invention in which an exclusive property or privilege is claimed are defined as follows:

1. In a record player having a motor driven turntable, a record supporting spindle with an ejector lever arranged to eject the lower record of a stack to said turntable, a record holding arm swingably and reciprocably mounted to overlie a stack of records on said spindle and a horizontally and vertically swingable pickup arm supported alongisde of said turntable, record changing mechanism comprising:

a hub and pinion on said turntable and driven therewith;

a support panel supporting said spindle and turntable;

a switch mounted on said panel with an operating arm and connected to energize the motor of the turntable;

a control arm movably mounted on said panel and having a finger piece connected to one of its ends and movable from off to on to reject positions;

a switch operating bar operatively connecting said control arm and said switch operating arm;

a change cycle gear rotatably mounted on said panel and having teeth engageable with the pinion on said turntable;

a segment of untoothed edge along the periphery of said gear opposed to said pinion in the starting position of said gear;

trip means mounted near the periphery of said gear and movable outwardly of the gear and engageable with a lug projecting from the hub on said turntable to move said gear to engage the gear with said pinion;

an actuator device connected to be oscillated by rotation of said gear;

an ejector link connected to said actuator device with one end opposed to the end of the ejector lever in said spindle to eject a record onto said turntable near the maximum throw of said actuator device;

a lift pin reciprocably mounted on said panel and and vertically engageable with said pickup arm;

lift means on said actuator device engageable with said lift pin upon initial and all advancing oscillation of said actuator device to lift said pin and said pickup arm;

an index plate rotatably drivingly connected to said pickup arm;

means on a swinging portion of said actuator device frictionally and rotatably drivingly engageable with said index plate to retract said plate in trailing relation to actuation of said lift pin;

a link having one end connected to a rotatable portion of said index plate with its other end positioned to actuate said trip means to engage said trip means with the lug on said hub;

a record sizing sector on said index plate having a sizing portion corresponding to the size of records to be played;

a first crank pivoted on said panel adjacent said gear and having one crank portion disposed in lapped relation relation to said gear and another crank portion extending to adjacent said sizing portion on said index plate;

a record sizing element movable with said other crank portion of said first crank and engageable with said sizing portion on said sizing sector;

detent means on said gear and said first crank which are engageable in the starting position of said gear;

a vertical support post for the record holding arm;

first shut-off means movably mounted on said panel and connected to said switch operating bar;

means on said first shut-off means engageable with said support post in the fully lowered position of said record holding arm to move said switch operating bar on its moveable connection to said control arm and toward said one portion on said first crank;

second shut-off means on said panel having a portion connected by a spring to said first shut-off means;

a second portion on said second shut-off means movable under the influence of said first-off means and said support post into blocking relation in the advancing path of said sizing sector;

a shut-off portion on said switch operating bar projecting to adjacent the end of the other crank portion on said first crank and opposed thereto in the advanced position of said first crank and the "on" and "reject" positions of said switch operating bar;

a second shut-off portion on said other crank portion of said first crank cooperable with said first shut-off portion;

means for opposing movement of said shut-off portions on one retracting motion of the first crank and yieldable on a succeeding advance of said first crank to permit movement of said shut-off portions; and said switch operating bar and the shut-off portion thereon being spring biased away from said first crank.

2. In a record player having a motor driven turntable, a record supporting spindle with an ejector lever arranged to eject the lower record of a stack to said turntable, a record holding arm swingably and reciprocably mounted to overlie a stack of records on said spindle and a horizontally and vertically swingable pickup arm supported alongside of said turntable, record changing mechanism comprising:

a pinion on said turntable and driven therewith;

a support panel supporting said spindle and turntable;

a switch mounted on said panel with an operating arm and connected to energize the motor of the turntable;

a first control arm fixedly pivoted to said panel and having a finger piece connected to its swinging end movable from off to on to reject positions;

a switch operating bar extending transversely of said panel and having a laterally fixed longitudinally movable connection relative to said first control arm and engageable with said switch arm;

a change cycle gear rotatably mounted on said panel and having teeth engageable with the pinion on said turntable;

a segment of untoothed edge along the periphery of said gear opposed to said pinion in the starting position of said gear;

means including a trip pawl pivoted near the periphery of said gear swingable outwardly of the gear and engageable with a lug projecting from the hub on said turntable to move said gear to engage the gear with said pinion;

an ear on said switch operating bar having a frictional driving connection with said trip pawl and movable with said switch operating bar and said first control arm to reject position to move said trip pawl to engage the pawl on said hub;

an actuator arm pivoted on said panel and connected to be oscillated by said gear from one extreme in the starting position of the gear;

an actuator lever connected to be oscillated by said actuator arm;

an ejector link connected to said actuator lever with one end opposed to the end of the ejector lever in said spindle to eject a record onto said turntable near the maximum throw of said actuator lever;

a cam arm pivotally mounted adjacent said actuator lever and having a lost-motion connection to said actuator lever and ejector lever;

a spring rotatably drivingly connecting said actuator lever to said cam arm in the advancing direction of said actuator lever;

a lift pin reciprocably mounted on said panel and vertically engageable with said pickup arm;

a first cam on said cam arm engageable with said lift pin upon initial and all advancing oscillation of said cam arm to lift said pin and said pickup arm;

an index plate rotatably drivingly connected to said pickup arm;

means on a swinging portion of said cam arm frictionally and rotatably drivingly engageable with said index plate to retract said plate in trailing relation to actuation of said lift pin;

a link wire having one end connected to a rotatable portion of said index plate with its other end having a frictional driving connection to said trip pawl to engage said trip pawl with the pawl on said hub;

a record sizing sector on said index plate having an edge corresponding to the size of records to be played;

a double arm crank pivoted on said panel adjacent said gear and having one lever arm disposed in lapped relation to said gear and an other lever arm extending to adjacent said edge on said index plate;

a record sizing pin movable with said lever arm of said double arm crank and engageable with said edge on said sizing sector;

a cam surface on said one lever arm having a detent notch therein;

a projection on said gear engageable in said detent notch in the starting position of said gear;

a cam on said gear behind said projection and engageable with said cam surface on said double arm crank as said projection leaves said detent notch to advance and hold said other lever arm and said sizing pin away from said edge on said sizing sector through initial rotation of said gear;

a fixed support on said panel adjacent said sizing sector and defining a vertical guide slot;

a vertical support post for the record holding arm having a laterally turned lower end non-rotatably engaged in said guide slot in all but the fully raised position of said support post;

a first shut-off crank pivoted on said panel and connected to said switch operating bar;

a projection on said first shut-off crank engageable with said support bar in the fully lowered position of said record holding arm to move said switch operating bar on its movable connection to said first control arm and toward said one lever arm on said double arm crank;

a second shut-off crank on said panel having one arm connected by a spring to said first shut-off crank;

a portion on said second shut-off crank movable under the influence of said first crank and said support bar into blocking relation in the advancing path of said sizing sector;

a shut-off portion on said switch operating bar projecting to adjacent the end of the other lever arm on said double arm crank and opposed thereto in the advanced position of said double crank and the "on" and "reject" positions of said switch operating bar;

a second shut-off portion on said other lever arm of said double arm crank cooperable with said first shut-off portion;

a leaf spring angularly springably mounted on one of said shut-off portions with its end spaced therefrom;

a blocking flange on said leaf spring projecting in opposed relation beyond said one shut-off portion to oppose movement of said shut-off portions into overlapping relation on one retracting motion of the double arm crank and laterally engageable and yieldable with said one shut-off portion on a succeeding advance of said double arm crank to permit movement of said shut-off portions into lapped engagement; and said switch operating bar and the shut-off portion thereon being spring biased away from said double armed crank to space said shut-off portions until acted upon by said first shut-off crank and said record holder post.

3. A record player according to claim 2, including a second control arm on said panel and having a finger piece connected to its swinging end selectively movable to different record size positions, means forming a sliding and pivot connection between said panel and said second control arm intermediate of the ends of the arm, said sizing pin being mounted on the opposite end of said second control arm, a first tension spring biasing said second control arm and sizing pin toward one end of said sliding and pivot connection of the arm, said record sizing sector having notches corresponding to the sizes of records to be played, and record size notches formed in said other arm of said double arm cranks selectively engageable with said sizing pin.

4. A record player according to claim 2, including a trip lever pivoted in frictional lapped relation to said trip pawl on said gear and having an ear depending below said gear and means including an ear on one of said trip elements engageable in an oversized notch in the other trip element forming a lost-motion rotary connection between the two trip elements.

5. A record player according to claim 2, including a second pin vertically reciprocably mounted on said cam arm and extending therethrough, a second cam on said panel in the path of said second pin and angularly displaced from the starting position of said first cam to advance said second pin after said first pin has raised said pickup arm, the means frictionally and drivingly engageable with said index plate includes a spring arm carried on a swinging portion of cam arm and extending across the path of said second pin to be deflected downwardly thereby and having a friction pad frictionally and rotatably drivingly engageable with said index plate to angularly retract said index plate and said pickup arm upon advancing motion of cam arm and vice versa.

6. In an automatic record changer and player having a vertically and laterally swingable pickup arm and a motor driven turntable with a stationary record supporting spindle projecting above and below the turntable;

an ejecting element mounted within said spindle and projecting below the turntable;

a change cycle gear;

cycle starting means arranged to engage said gear with said turntable for one rotational cycle of the gear;

an indexing element connected to and oscillatably driven by horizontal movement of said pickup arm and having record sizing projections spaced angularly therearound;

said cycle starting means being connected to said indexing element to be actuated thereby;

an actuator element oscillatably driven between two extremes by said gear;

an ejector operating member arranged to engage and operate said ejecting element by and during a portion of the travel of said actuator element;

a manually adjustable size selecting element;

a crank member adjacent said gear;

means forming plural adjacent interengaging detent positions between said crank member and said size selecting element selectively engageable by adjustment of the selecting element and movable in selective arcs about the pivot of said crank into the paths of said sizing projections;

first means positively drivingly connectible between said actuator element and said pickup arm to raise said pickup arm upon initial advancing motion of said actuator element;

second means forming a frictional driving engagement between said actuator element and said index element and operative after said positively driving means has raised said pickup arm;

cam means engageable between said cycle gear and said crank member arranged to hold said crank member in a retracted position as said gear drives said actuator element through its advancing motion and as the gear completes a change cycle rotation; and resilient means connected to advance said crank member when the cam means releases the crank member.

7. An automatic record changer and player according to claim 6, in which said ejecting element is a lever pivoted within said spindle;

said indexing element is a plate having an oscillating record sizing sector thereon and said record sizing projections are provided by stops on said sector;

said size selecting element is a lever which is mounted for pivotal and sliding movement relative to said actuator element;

said crank member has a fixed pivot support; and said first and second means comprise cam means.

8. An automatic record changer and player according to claim 7, including a record support arm having a vertically reciprocable supporting post on one end;

a stop crank pivotally supported on said changer;

said stop crank being biased to inactive position and having a driving engagement with said post to move the crank to activated position in the fully lowered position of the post and record support arm;

a projection movable into blocking relation to advancing motion of said index plate when said stop crank is activated;

a switch electrically connected to energize the motor of said turntable and having an operating lever;

an on-off lever pivotally mounted on said changer and having a manual operating hand piece;

a switch bar reciprocably mounted on said changer and engageable with the lever of said switch;

a pivot connection between said switch bar and an intermediate portion of said on-off lever reciprocably drivingly engageable with the switch bar and longitudinally slideable relative to said on-off lever;

a spring biasing said last pivotal connection to one end of its slideable connection;

a link connected between said switch bar and said stop crank to displace the switch bar on the sliding connection thereof toward said crank member upon activation of said stop crank;

coacting abutments on a swinging portion of said crank member and said switch bar engageable in the displaced position of the switch bar and the advanced position of said crank member;

a yieldable blocking element carried by one abutment preventing engagement of said abutments in the advanced position of said crank member and upon the first retraction of said crank member after actuation of said stop crank; and blocking element being yieldable upon the succeeding advance of said crank member by engagement with the other of said abutments permitting advance of the abutment on said crank member without movement of said switch bar and permitting engagement of said abutments upon the following retraction of said crank member to move the other abutment and switch bar to switch off position.

9. An automatic record changer and player according to claim 8, including a second stop crank, spring means drivingly connecting said first and second stop cranks to actuate said second crank from said first crank, said projection for blocking advancing motion of said index plate being mounted on said second stop crank.

10. In an automatic record changer and player having a vertically and laterally swingable pickup arm and a motor driven turntable with a stationary record centering spindle projecting above the turntable, the combination comprising:

an ejector member movably mounted within said spindle and having an ejector portion positioned in spaced relation above the turntable to eject the bottom record of a stack of records supported on said spindle and having an actuating portion exposed on said spindle below said turntable;

a change cycle actuating member movably supported adjacent said turntable;

cycle starting means arranged to drivingly couple said actuating member with the motor of said turntable for a single cycle of motion of the actuating member;

an indexing element connected to and swingable with said pickup arm;

means actuated by movement of said indexing element and said pickup arm to radially inwardly advanced position of the pickup arm to engage said cycle starting means to thereby actuate said actuating member;

an ejector operating member for engaging and actuating said ejector member during the advance of the actuating member;

lift means actuated upon advancing motion of said actuating member and all further advanced positions thereof arranged to lift said pickup arm away from said turntable; and an index drive member driven by said actuating member and movable into driving engagement with said index element.

11. In an automatic record changer and player having a vertically and laterally swingable pickup arm and a motor driven turntable with a stationary record centering spindle projection above the turntable;

an ejector member movably mounted within said spindle and having an ejector portion positioned in spaced relation above the turntable to eject the bottom record of a stack of records supported on said spindle and having an actuating portion exposed on said spindle below said turntable;

a change cycle actuating member oscillatably supported adjacent said turntable;

cycle starting means arranged to drivingly engage said actuating member with the motor of said turntable for a single oscillation of advancing and retracting motion of the actuating member, an indexing element connected to and oscillatable horizontally with said pickup arm;

means actuated by movement of said indexing element and pickup arm to radially inwardly advanced position of the pickup arm to actuate said actuating member and engage said cycle starting means;

an ejector operator member connected to said actuating member and movable therewith to engage and actuate said ejector member during the advance of the actuating member;

first means actuated upon advancing motion of said actuating member and all further advanced positions thereof arranged to lift said pickup arm away from said turntable;

an index drive member carried by said actuating member and movable relative thereto into two-way driving engagement with said indexing element after initial advance of said actuating member;

record size selecting means including a size selecting member and a movable operating member engageable therewith in different selected and adjusted positions relative to said operating member;

adjustable stop means including portions mounted on and engageable between said indexing element and said size selecting member, said stop means being adjustable to vary the relative positions between said indexing element and said size selecting member by positioning said size selecting member in a different selected position relative to said operating member; and means operative upon oscillation of said actuating member to move said movable operating member and said size selecting member and the portion of said stop means connected thereto to retracted position during advancing motion of said change cycle actuating member and to advance and retract said size selecting member during retraction of the actuating member.

12. An automatic record changer and player according to claim 11, in which said stop means includes plural coacting stops which are engageable between said indexing element and said size selecting member in different advancing positions of said indexing element and advanced positions of said operating member.

13. An automatic record changer and player according to claim 11 wherein said size selecting member is movably supported adjacent the indexing element and said operating member is movably supported adjacent said actuating member, said stop means including means forming plural adjacent interengaging detent portions selectively engageable between movable portions of said operating member and said size selecting member engageable by adjustment of the selecting member and movable in different selected paths determined by the point of engagement therebetween, means arranged to adjust said size selecting member to different detent positions, said indexing element and said size selecting member having plural adjacent interengaging stop portions engageable in different positions upon advancing motion of said indexing element and an advance position of said operating member and disengageable upon retracting motion of said operating member, and other cam means engageable between said actuating member and said operating member arranged to advance the interengaging portions of said size selecting member and operating member after said index drive member has retracted said indexing element.

14. An automatic record changer and player according to claim 13, in which said size selecting member is a lever pivotally supported adjacent the indexing plate and the operating member is a crank pivotally supported adjacent the actuating member and spring means biasing said crank member to adjusted position against said other cam means.

15. In an automatic record changer and playing having a vertically and laterally swingable pickup arm and a motor driven turntable, the combination comprising:

a change cycle actuating member movably supported adjacent said turntable;

cycle starting means arranged to drivingly couple said acutating member with the motor of the turntable for a single record-changing cycle of movement of said actuating member;

an indexing element connected to and swingable with said pickup arm;

means responsive to radially inward movement of said pickup arm and said indexing element to operate said cycle starting means and thereby start the record-changing cycle of movement of said actuating member;

lift means to lift the pickup arm away from the turntable; and said indexing element and said actuating member having coupled thereto cooperating slippable clutch parts and means for moving said clutch parts into driving engagement with each other to move said pickup arm outwardly during the record-changing cycle.

16. An automatic record changer and player according to claim 15, in which the indexing element has a flat surface forming one of said clutch parts and said actuating member has a friction pad mounted thereon and movable into frictional engagement with said surface to provide a two-way friction drive between said indexing element and said actuating member during a portion of the record-changing cycle.

References Cited

UNITED STATES PATENTS

| | | | |
|---|---|---|---|
| 2,394,539 | 2/1946 | Erwood et al. | 274—10 |
| 2,584,257 | 2/1952 | Cain | 274—10 |
| 2,795,429 | 6/1957 | Vistain | 274—10 |
| 3,218,078 | 11/1965 | Freier | 274—10 |

HARRY N. HAROIAN, *Primary Examiner.*